United States Patent [19]

Fujii et al.

[11] Patent Number: 4,498,700
[45] Date of Patent: Feb. 12, 1985

[54] VENTILATOR FOR TWO- OR THREE-WHEELED VEHICLE

[75] Inventors: Takayuki Fujii, Ooi; Norio Tanaka, Tokyo, both of Japan

[73] Assignee: Honda Giken Kogyo Kabushiki Kaisha, Tokyo, Japan

[21] Appl. No.: 455,516

[22] Filed: Jan. 4, 1983

[30] Foreign Application Priority Data

Jan. 7, 1982 [JP] Japan .................................... 57-1129

[51] Int. Cl.³ ............................................. B62J 17/02
[52] U.S. Cl. .................................. 296/78.1; 296/208; 280/289 S
[58] Field of Search .............................. 296/208, 78.1; 280/289 S

[56] References Cited

U.S. PATENT DOCUMENTS 4,130,315 12/1978 Shields .............................. 296/78.1

FOREIGN PATENT DOCUMENTS 905672 9/1962 United Kingdom ............... 296/78.1

Primary Examiner—Robert R. Song
Attorney, Agent, or Firm—Armstrong, Nikaido, Marmelstein & Kubovcik

[57] ABSTRACT

A ventilator for two- or three-wheeled vehicles, such as motor scooters, having a front body provided with at least a front panel covering the front of a head pipe and a leg shield covering the legs and feet of the rider sitting on a seat, wherein an air inlet for introducing the airflow resulting from vehicle traveling is formed in the front panel, air outlets for blowing the airflow are formed in the leg shield, and moreover, an air passage allowing the air inlet and the air outlets to communicate with each other is formed inside the front body.

11 Claims, 9 Drawing Figures

VENTILATOR FOR TWO- OR THREE-WHEELED VEHICLE

BACKGROUND OF THE INVENTION

1. Field of the Invention

The present invention relates to a ventilator for two- or three-wheeled vehicle, which is adapted for introducing an airflow toward the legs and feet of the rider resulting from the forward movement of the vehicle.

2. Description of the Prior Art

In conventional two- or three-wheeled vehicles, such as motor scooters, having a front body provided with at least a front panel covering the front of a head pipe and a leg shield covering the rider's legs and feet, since the vehicle front body undesirably blocks the airflow resulting from traveling, hot air is apt to remain around the rider's leg and feet when the temperature is high, e.g., in the summer, making the rider feel uncomfortable.

SUMMARY OF THE INVENTION

It is, therefore, a primary object of the present invention to provide a simply constructed ventilator for two- or three-wheeled vehicles, wherein an air inlet for introducing the airflow resulting from vehicle movement is disposed in the front panel of the front body, and air outlets for blowing the airflow are disposed in the leg shield thereof, and moreover, an air passage allowing the air inlet and the air outlets to communicate with each other is formed inside the front body so that the airflow passes through the front body with only a small resistance and directly blows against the rider's legs and feet, thereby resolving the above-mentioned problem of the prior art.

Another object of the invention is to provide a ventilator for two- or three-wheeled vehicles, wherein a part of that airflow resulting from the vehicle's forward movement, which is introduced from the air inlet in the front panel of the vehicle front body and passes through the air passage and is blown from the air outlets in the leg shield of the front body, is made to pass through an engine room from a rear air inlet opened in the front surface of the rear body of the vehicle. The air flows then out from a rear air outlet opened in the rear surface of the rear body, thereby improving the engine cooling effect.

Still another object of the invention is to provide a ventilator for two- or three-wheeled vehicles, wherein an airflow regulating mechanism is provided to each of the air outlets opened in the leg shield of the vehicle front body. The airflow regulating mechanism permits the rider to regulate the amount of the airflow blown out from the air outlets against the rider's legs and feet as the rider desires, thereby further improving the rider's comfort.

The above and other objects and advantageous features of the present invention will become apparent from the following detailed description of one preferred embodiment taken in conjunction with the accompanying drawings.

DESCRIPTION OF THE PREFERRED EMBODIMENT

Figure 1:
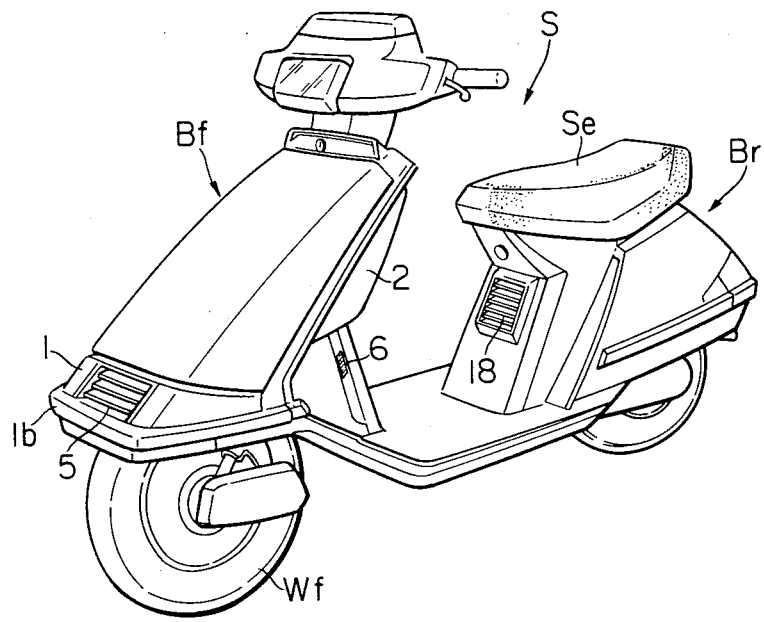
FIG. 1 is a perspective view of a motor scooter equipped with a ventilator in accordance with the present invention as seen from the front side thereof.
Figure 2:
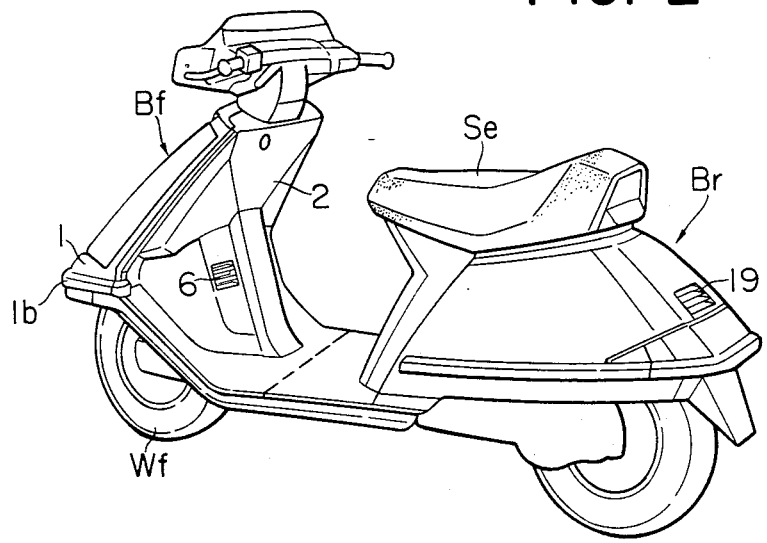
FIG. 2 is a perspective view of the motor scooter shown in FIG. 1 as seen from the rear side thereof.
Figure 3:
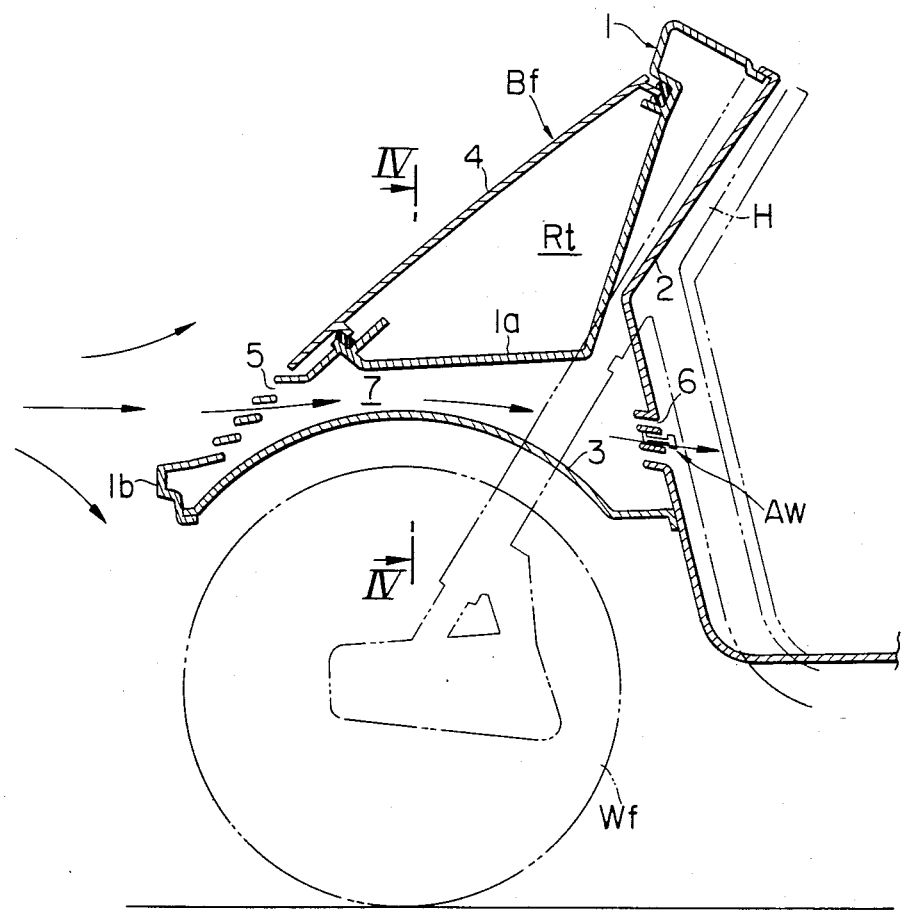
FIG. 3 is a sectional side elevational view of the front body of the motor scooter shown in FIG. 1.
Figure 4:
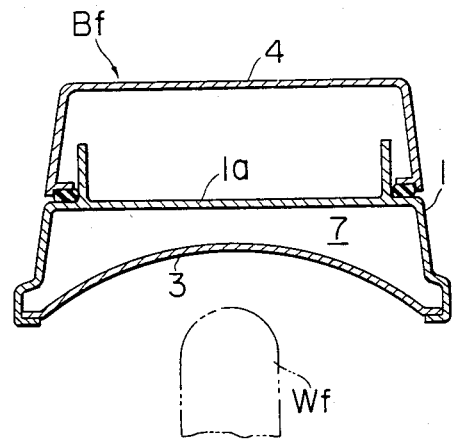
FIG. 4 is a sectional view taken along the line IV—IV of FIG. 3.

One preferred embodiment of the present invention applied to a motor scooter will be described hereinunder with reference to FIGS. 1 thru 7.

A front body Bf of a motor scooter S comprises a front panel 1 covering the front of a head pipe H, a leg shield 2 covering the front of the legs and feet of the rider sitting on a seat Se, and a front fender 3 covering the upper part of a front wheel Wf. The rear surface of the front panel 1 and the front surface of the leg shield 2 are integrally connected, while the front fender 3 is integrally connected to the lower parts of the front panel 1 and the leg shield 2.

A trunk shell 1a is formed in the front center of the front panel 1. The open front surface of the trunk shell 1a is covered with a trunk cover 4 so as to be opened and closed at will. A trunk room Rt is defined by the trunk shell 1a and the trunk cover 4.

An air inlet 5 for introducing the airflow resulting from vehicle movement is provided in the lower part of the front panel 1 below the trunk room Rt, while air outlets 6, 6 for blowing the airflow are provided in the right and left parts of the leg shield 2. The air inlet 5 and the air outlets 6, 6 are allowed to communicate with each other through an air passage 7 defined in the front body Bf by the front fender 3 and the leg shield 2.

The leg shield 2 is provided with airflow regulating mechanisms Aw for regulating the opening of each of the air outlets 6. The structure of the mechanism Aw will be described hereinunder with reference to FIGS. 6 and 7. Two pairs of brackets 8, 8; 9, 9 are inwardly projected from both the side edges of each of the air outlets 6 formed in the leg shield 2. Basal parts 11, 11; 12, 12 of airflow regulating plates 10, 10 are pivotally connected with these brackets 8, 8; 9, 9, respectively. In addition, both the head-side ends of a T-shaped operation lever 13 are connected to one end side edges of the regulating plates 10, 10 through pins 14, 15, respectively. Moreover, the leg-side end of the operation lever 13 is projected toward the rear of the leg shield 2 through a slit 16 formed in the wall of the leg shield 2, and an operation knob 17 is connected to the projecting end thereof. Vertically moving the operation knob 17 along the slit 16 permits the airflow regulating plates 10, 10 to be vertically pivoted about the pivotally connecting points 11, 12, respectively, thereby allowing the area of each air outlet 6 to be variably regulated. The airflow regulating plates 10, 10 are maintained at any regulation positions by means of the frictional resistance caused at portions of the brackets 8, 9, the airflow regulating plates 10, 10 and the operation lever 13, which are in contact with one another.

In FIGS. 1 thru 7, a front bumper 1b is integrally formed at the lower part of the front panel 1, while a rear body Br is adapted to house an engine therein. Moreover, a rear air inlet 18 is provided in the front surface of the rear body Br, while a rear air outlet 19 is provided in the rear surface thereof.

The operation of one preferred embodiment of the invention shown in FIGS. 1 thru 7 will be described hereinunder. Assuming now that the motor scooter travels toward the left side as viewed in FIG. 5 (as shown by a blank arrow in FIG. 5), a part of the airflow blowing against the front panel 1 of the front body Bf passes through the air inlet 5 as shown by solid-line arrows (x) in FIG. 5 to flow into the front body Bf. The airflow then passes through the air passage 7 defined in the inside thereof and then is blown out from the air outlets 6, 6 toward the legs and feet of the rider sitting on the seat Se. In this case, the vicinity of the air inlet 5 tends to be under a positive pressure, while the vicinity of each of the air outlets 6, 6 tends to be under a negative pressure. Therefore, the airflow is positively introduced into the air passage 7 and moreover, the airflow (shown by solid-line arrows (x) in FIG. 5) blown out from the air outlets 6, 6 provides a settling effect to the airflow (shown by dotted-line arrows (y) in FIG. 5) flowing along both the outside surfaces of the front body Bf so as to prevent the generation of turbulent flows such as shown by chain-line arrows in FIG. 5. Accordingly, the hot air remaining around the legs and feet of the rider sitting on the seat Se is swept away, thereby allowing the rider to continue a comfortable drive.

Figure 5:
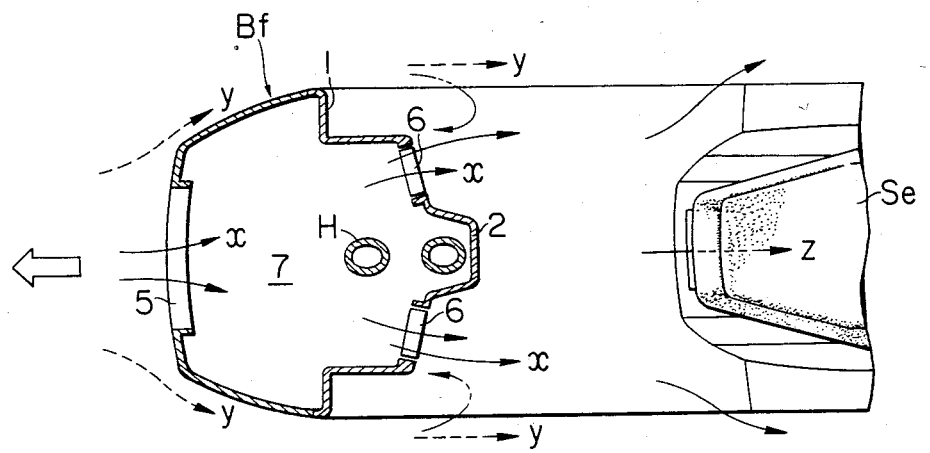
FIG. 5 is a sectional plan view of the front body of the motor scooter shown in FIG. 1.

Moreover, a part (shown by a solid-line arrow (z) in FIG. 5) of the airflow blown out from the air outlets 6, 6 enters the rear air inlet 18 in the front surface of the rear body Br, passes through the engine room and flows out from the rear air outlet 19, thereby permitting improvement in the engine-cooling effect.

Furthermore, since the amount of the airflow blown out from the air outlets 6, 6 can be regulated by the airflow regulating mechanisms Aw provided to these air outlets, the rider can regulate the amount of airflow blowing against his legs and feet as desired, so that the rider can enjoy a comfortable ride.

Figure 8:
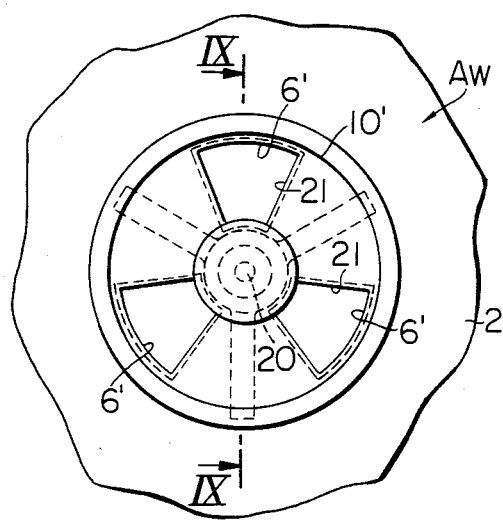
FIG. 8 is a front view of a modification of the airflow regulator shown in FIG. 6.
Figure 6:
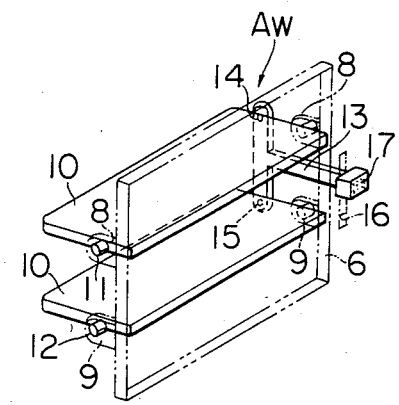
FIG. 6 is a perspective view of an airflow regulator in accordance with the present invention.
Figure 9:
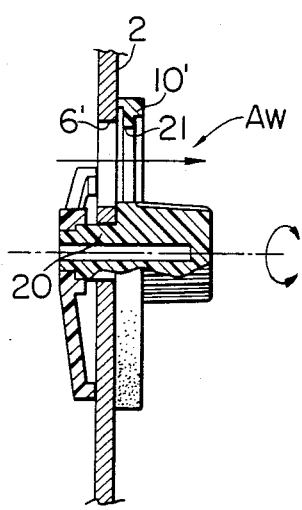
FIG. 9 is a sectional view taken along the line IX—IX of FIG. 8.
Figure 7:
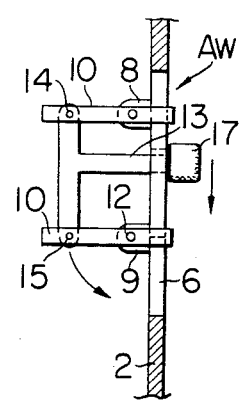
FIG. 7 is a side elevational view of the airflow regulator shown in FIG. 6.

FIGS. 8 and 9 show a modification of the airflow regulating mechanism Aw. In the modification, a plurality of air outlets 6'... are radially opened in the wall of the leg shield 2 and moreover, a disk-shaped airflow regulating plate 10' is rotatably supported on the wall of the leg shield 2 through a shaft 20. The regulating plate 10' has a plurality of regulation openings 21... radially formed so that they can correspond to the air outlets 6'.... Rotation of the regulating plate 10' permits the opening area of each of the air outlets 6'... to be variably regulated. The airflow regulating plate 10' is maintained at any regulation position by means of the frictional resistance caused at contact portions between the airflow regulating plate 10' and the leg shield 2.

As will be understood from the foregoing description, according to the invention, since the air inlet for introducing the airflow resulting from vehicle movement is provided in the front panel of the front body, while the air outlets for blowing the airflow are provided in the leg shield thereof, and moreover, since the air passage allowing the air inlet and the air outlets to communicate with each other is formed in the front body, a part of the airflow blowing against the front panel can be passed through the front body and blown out from the air outlets toward the rear part of the front body. Accordingly, it is possible to sweep away the hot air remaining around the rear part of the front body and blow a fresh airflow toward the legs and feet of the rider sitting on the seat, thereby allowing the rider to continue a comfortable drive.

Moreover, according to the invention, it is possible to improve the engine-cooling effect and prolong the life of the engine, since a part of the airflow resulting from vehicle movement, which is introduced into the air inlet in the front panel of the front body, passed through the air passage and blown out from the air outlets in the leg shield of the front body, is made to pass from the rear air inlet provided in the front surface of the rear body through the engine room and flow out from the rear air outlet provided in the rear surface of the rear body.

Furthermore, according to the invention, since the airflow regulating mechanism is provided on each of the air outlets opened in the leg shield of the front body, the rider can regulate the amount of the airflow blown out from the air outlets and blowing against the rider's legs and feet as desired. Accordingly, the rider can enjoy a more comfortable ride.

It is to be noted that although the ventilator of the invention is applied to a scooter in the above-described embodiment, the invention can, of course, be applied to other two- or three-wheeled vehicles. Moreover, it may be understandable for those skilled in the art that various modifications can be made without departing from the scope of the invention which is limited solely by the appended claims.

What is claimed is:

1. A ventilator for a two- or three-wheeled vehicle including a front body having at least a front panel covering the front of a head pipe and a leg shield covering legs and feet of a rider sitting on a seat, said front panel having its front edge portion located forwardly and upwardly of a front wheel of the vehicle, said front panel extending rearwardly while surrounding said head pipe by side wall portions thereof and being connected to said leg shield to define an interior space between said front panel and said leg shield, said ventilator comprising:
    an air inlet means provided in said front panel for the intake of airflow produced by movement of the vehicle;
    an air outlet means provided in said leg shield for exhausting said airflow; and
    an air passage for communicating said air inlet and outlet means, said interior space between said front panel and said leg shield serving as said air passage of the ventilator.

2. A ventilator as defined in claim 1, wherein said leg shield is provided with an airflow regulating mechanisms for regulating the opening of said air outlet means.

3. A ventilator as defined in claim 2, wherein said airflow regulating mechanism comprises:
    two pairs of brackets projecting inwardly from side edes of the air outlet means;
    airflow regulating plates pivotally connected between the brackets of the respective pairs of brackets;
    a T-shaped operation lever the ends of the crosspiece of which are connected to the lateral edges at one end of said airflow regulating plates by respective pins; and an operating knob connected to the end of the central arm of the operation lever, which projects rearwardly of said leg shield through a slot formed in the wall of said leg shield.

4. A ventilator as defined in claim 2, wherein said airflow regulatng mechanism comprises a disk-shaped airflow regulating plate which is rotatably supported on the wall of said leg shield, said airflow regulating plate having a plurality of regulating openings which extend radially and correspond to a plurality of air outlets extending radially in said wall of said leg shield, which air outlets constitute said air outlet means.

5. A ventilator as defined in claim 1, wherein a rear air inlet is formed in the front surface of a rear body of the vehicle, while a rear air outlet is formed in the rear surface of the rear body.

6. A ventilator as defined in claim 1, wherein a trunk room is provided in the front panel above said air passage and a shell defining said trunk room serves as an upper wall of said air passage.

7. A ventilator as defined in claim 1, wherein said air inlet means is provided in a front face of the front panel adjacent said front edge portion.

8. A ventilator as defined in claim 1, wherein a rear body of the vehicle, rear inlet is formed in the front surface of a facing the leg shield of said front body.

9. A ventilator as defined in claim 3, wherein said air outlet means includes two air outlets and said airflow regulating mechanism is provided for each of said outlets.

10. A ventilator as defined in any one of claims 2–9, whrein said air outlet means on the front body is provided in said leg shield at a position offset sidewardly with respect to a vertical center line of said leg shield.

11. A ventilator as defined in claim 10, wherein said air outlet means has its two outlets opened in left and right sides of the leg shield in symmetrical relation about said vertical center line.

* * * * *